US009575960B1

(12) United States Patent
Lerner et al.

(10) Patent No.: US 9,575,960 B1
(45) Date of Patent: Feb. 21, 2017

(54) AUDITORY ENHANCEMENT USING WORD ANALYSIS

(71) Applicant: Amazon Technologies, Inc., Reno, NV (US)

(72) Inventors: David M. Lerner, Seattle, WA (US); Brandon J. Smith, Seattle, WA (US); Jon Robert Ducrou, Seattle, WA (US); Erik J. Miller, Seattle, WA (US); Marcus A. Barry, Seattle, WA (US); Kenneth O. Sanders, II, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 688 days.

(21) Appl. No.: 13/621,806

(22) Filed: Sep. 17, 2012

(51) Int. Cl.
*G06F 17/24* (2006.01)
*G10L 13/08* (2013.01)
*G10L 13/07* (2013.01)
*G10L 19/12* (2013.01)
*G06F 3/0481* (2013.01)
*G06F 17/27* (2006.01)
*G06F 3/0485* (2013.01)
*G06F 3/0483* (2013.01)
*G06F 3/0488* (2013.01)

(52) U.S. Cl.
CPC ................................ *G06F 17/2785* (2013.01)

(58) Field of Classification Search
CPC .. G06F 3/0483; G06F 3/0485; G06F 3/04883; G06F 3/016; G06F 3/038; G06F 3/0346; G06F 3/0488; G06F 3/03543; G06F 3/0202; G06F 3/0481; G06F 17/2785; G06F 17/30864; G06F 17/30017; G06F 17/24; G06Q 10/10; A61B 3/113; H04N 9/045; H04N 5/232; G02B 27/017

USPC ...... 707/706; 704/9; 709/204; 715/863, 256, 715/785, 201, 776, 202; 345/8, 173, 158, 345/684, 157, 619, 156, 168, 163, 661, 345/419, 473; 348/78, 222.1, 211.1
See application file for complete search history.

(56) References Cited

U.S. PATENT DOCUMENTS

| 2,002 A | * | 3/1841 | Rider .............................. 111/81 |
| 6,331,867 B1 | * | 12/2001 | Eberhard .............. G06F 1/1626 |
| | | | 715/824 |
| 6,437,758 B1 | * | 8/2002 | Nielsen et al. ................... 345/8 |
| 6,446,040 B1 | * | 9/2002 | Socher .................. G10L 13/027 |
| | | | 704/260 |

(Continued)

FOREIGN PATENT DOCUMENTS

JP 02006004409 A * 1/2006

*Primary Examiner* — Pierre-Louis Desir
*Assistant Examiner* — Anne Thomas-Homescu
(74) *Attorney, Agent, or Firm* — Polsinelli LLP

(57) ABSTRACT

One or more words at a specified location in an electronic document can be identified. The identified one or more words can be analyzed to determine one or more semantic meanings associated with the words. An audio clip (i.e., audio file, audio element) associated with or corresponding to (the semantic meaning(s) of) the one or more words can be searched for in an audio database. The search for the audio clip associated with the one or more words can utilize an index that specifies the associations between words and audio clips. In some embodiments, the audio clip can be played when an estimated location of where the user is reading is at or near the specified location of the one or more words. In some embodiments, the audio clip can be played when it is calculated that the user is reading the one or more words at the specified location.

23 Claims, 8 Drawing Sheets

(56) References Cited

U.S. PATENT DOCUMENTS

| | | | | |
|---|---|---|---|---|
| 6,751,592 B1* | 6/2004 | Shiga | | G10L 13/07 704/258 |
| 7,020,663 B2* | 3/2006 | Hay | | G06Q 30/06 434/317 |
| 7,572,008 B2* | 8/2009 | Elvesjo et al. | | 351/206 |
| 8,073,695 B1* | 12/2011 | Hendricks et al. | | 704/260 |
| 8,098,976 B1* | 1/2012 | Acharya | | H04N 21/4756 386/241 |
| 8,185,845 B2* | 5/2012 | Bjorklund et al. | | 715/863 |
| 8,271,865 B1* | 9/2012 | Bennett | | 715/201 |
| 8,451,344 B1* | 5/2013 | Karakotsios | | 348/222.1 |
| 8,744,137 B2* | 6/2014 | Sakai | | G06F 3/017 382/115 |
| 8,744,855 B1* | 6/2014 | Rausch | | 704/270 |
| 2004/0016809 A1* | 1/2004 | Song | | 235/449 |
| 2004/0059782 A1* | 3/2004 | Sivertsen | | 709/204 |
| 2005/0084836 A1* | 4/2005 | Anderson | | 434/308 |
| 2006/0256083 A1* | 11/2006 | Rosenberg | | 345/156 |
| 2006/0256133 A1* | 11/2006 | Rosenberg | | 345/619 |
| 2007/0033032 A1* | 2/2007 | Schubert | | G10L 15/22 704/235 |
| 2007/0078878 A1* | 4/2007 | Knable | | 707/101 |
| 2008/0316212 A1* | 12/2008 | Kushler | | G06F 3/0482 345/467 |
| 2009/0063991 A1* | 3/2009 | Baron | | H04L 12/1822 715/751 |
| 2009/0307207 A1* | 12/2009 | Murray | | G06F 17/30026 |
| 2009/0315827 A1* | 12/2009 | Elvesjo et al. | | 345/157 |
| 2010/0050064 A1* | 2/2010 | Liu et al. | | 715/202 |
| 2010/0125816 A1* | 5/2010 | Bezos | | 715/863 |
| 2010/0315359 A1* | 12/2010 | Seong et al. | | 345/173 |
| 2011/0013007 A1* | 1/2011 | Holmberg et al. | | 348/78 |
| 2011/0041052 A1* | 2/2011 | Fraisl | | G06F 17/21 715/234 |
| 2011/0050593 A1* | 3/2011 | Kim et al. | | 345/173 |
| 2011/0066965 A1* | 3/2011 | Choi | | 715/776 |
| 2011/0069277 A1* | 3/2011 | Blixt et al. | | 351/210 |
| 2011/0175932 A1* | 7/2011 | Yu et al. | | 345/661 |
| 2011/0195388 A1* | 8/2011 | Henshall et al. | | 434/317 |
| 2011/0205148 A1* | 8/2011 | Corriveau et al. | | 345/156 |
| 2011/0205379 A1* | 8/2011 | Konicek | | 348/211.1 |
| 2011/0246173 A1* | 10/2011 | Li | | G06F 17/2827 704/2 |
| 2011/0254768 A1* | 10/2011 | Tsuta | | 345/163 |
| 2012/0001923 A1* | 1/2012 | Weinzimmer et al. | | 345/473 |
| 2012/0039505 A1* | 2/2012 | Bastide et al. | | 382/103 |
| 2012/0098837 A1* | 4/2012 | Hulbert et al. | | 345/473 |
| 2012/0256967 A1* | 10/2012 | Baldwin et al. | | 345/684 |
| 2012/0278337 A1* | 11/2012 | Acharya | | G06F 17/30796 707/748 |
| 2012/0300061 A1* | 11/2012 | Osman | | G06F 1/3231 348/135 |
| 2012/0311438 A1* | 12/2012 | Cranfill et al. | | 715/256 |
| 2013/0006957 A1* | 1/2013 | Huang | | G06F 3/017 707/706 |
| 2013/0027302 A1* | 1/2013 | Iwaizumi et al. | | 345/158 |
| 2013/0038599 A1* | 2/2013 | Krakowski | | 345/419 |
| 2013/0060784 A1* | 3/2013 | Acharya | | G06F 17/30843 707/748 |
| 2013/0100025 A1* | 4/2013 | Vernacchia | | 345/168 |
| 2013/0152014 A1* | 6/2013 | Rabii et al. | | 715/785 |
| 2013/0168954 A1* | 7/2013 | Koren et al. | | 281/15.1 |
| 2013/0169560 A1* | 7/2013 | Cederlund et al. | | 345/173 |
| 2013/0185307 A1* | 7/2013 | El-Yaniv | | G06F 17/2785 707/748 |
| 2013/0209981 A1* | 8/2013 | Newell | | 434/317 |
| 2013/0246383 A1* | 9/2013 | White et al. | | 707/706 |
| 2013/0275120 A1* | 10/2013 | DeGross | | 704/9 |
| 2013/0300654 A1* | 11/2013 | Seki | | 345/156 |
| 2013/0307771 A1* | 11/2013 | Parker et al. | | 345/158 |
| 2013/0307786 A1* | 11/2013 | Heubel | | 345/173 |
| 2013/0342672 A1* | 12/2013 | Gray et al. | | 348/78 |
| 2014/0002341 A1* | 1/2014 | Nister et al. | | 345/156 |
| 2014/0003654 A1* | 1/2014 | Beaurepaire | | 382/103 |
| 2014/0006308 A1* | 1/2014 | Baggott et al. | | 705/347 |
| 2014/0037111 A1* | 2/2014 | Uhle et al. | | 381/119 |
| 2014/0146156 A1* | 5/2014 | Strombom et al. | | 348/78 |
| 2014/0253437 A1* | 9/2014 | Vaught et al. | | 345/156 |
| 2014/0310256 A1* | 10/2014 | Olsson et al. | | 707/706 |
| 2016/0005402 A1* | 1/2016 | Schubert | | G10L 15/22 704/235 |

* cited by examiner

AUDITORY ENHANCEMENT USING WORD ANALYSIS

BACKGROUND

Computing devices are often used for reading purposes. Computing devices are commonly used to view electronic documents, such as electronic books, word processing files, slideshow files, and electronic messages and documents. Reading typically only requires the reader's visual perception; in other words, a reader typically only needs to see the words in a document to be able to read them. As such, a reader's auditory perception is left alone. However, because the reader's auditory perception is available, when reading a document he/she can sometimes be distracted by background noise, such as when there is construction noise outside a library or traffic noise outside a home. Sometimes, the user may choose to listen to music while he/she reads in order to try to reduce the distraction caused by background noise. Other times, a reader and/or audience may find that conventional approaches to reading are not engaging or entertaining enough. For example, some children do not find reading by looking at words to be entertaining, only tolerating a book if it is read to them. Moreover, some readers may find it more entertaining, interactive, and fun if their auditory perception was engaged as well. Accordingly, it would be beneficial to provide auditory enhancements to reading experiences.

BRIEF DESCRIPTION OF THE DRAWINGS

Various embodiments in accordance with the present disclosure will be described with reference to the drawings, in which.

DETAILED DESCRIPTION

Figure 1:
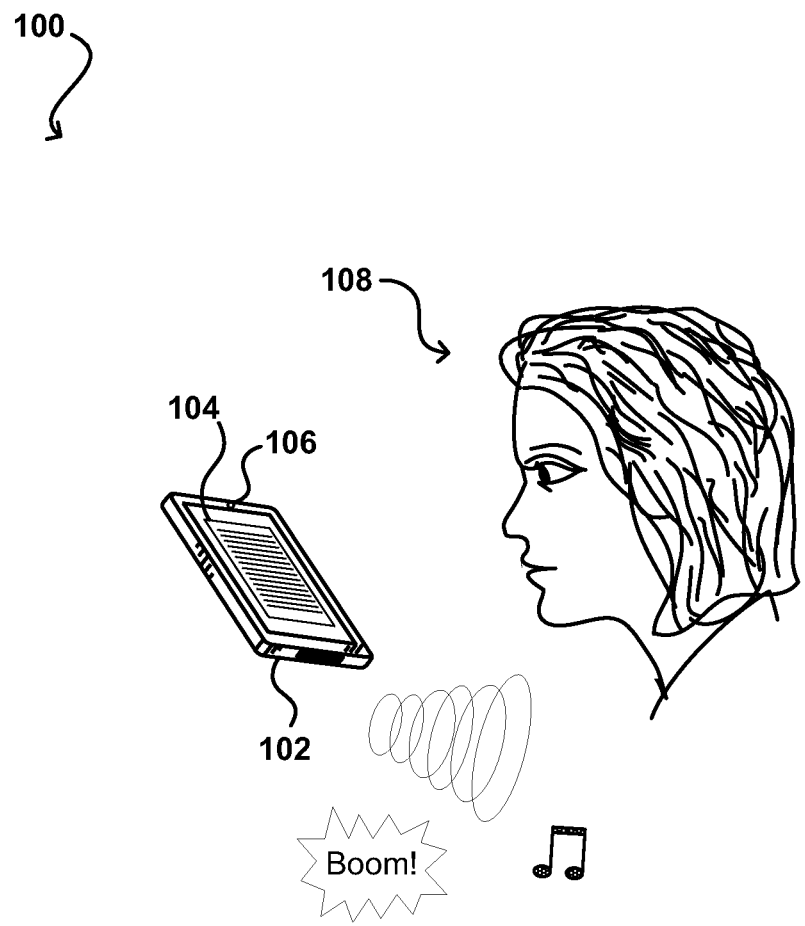
FIG. 1 illustrates an example environment in which aspects of the various embodiments can be utilized.

Systems and methods in accordance with various embodiments of the present disclosure overcome one or more of the above-referenced and other deficiencies in conventional approaches to presenting electronic readable material. In particular, various embodiments can provide one or more audio clips, files, or other audible elements, that are associated with (e.g., that correspond to) one or more words or locations in an electronic document. The audio clips (i.e., audio files, audio elements) can be played at calculated times to supplement and/or enhance the overall user experience of reading the electronic document.

The electronic document can be displayed in an application running/executing on a computing device. The computing device can select one or more words in the electronic document for which to play a corresponding sound or audio element. In some embodiments, the one or more words can be analyzed to determine one or more semantic meanings associated with the one or more words. The words (and/or semantic meanings associated with the words) can be input into a dictionary/index to search for audio clips (i.e., audio files, audio elements) corresponding to the words (and/or semantic meanings). For example, words such as "happy birthday," "summer vacation," or "joy" can trigger happy/joyous music to be played, whereas words like "yelled at me," "was enraged," or "furious" can trigger more intense music. In some embodiments, certain "key" words, such as "jingle," "thud," or "boom," can trigger corresponding audio clips (e.g., a jingle sound effect, a thud sound effect, a boom sound effect, respectively) to be played without semantic analyses of the key words.

In some embodiments, a meaning (e.g., semantic meaning) associated with a word can generally be something that is conveyed, signified, expressed, and/or indicated by a word. For example, a (semantic) meaning can be a definition of the word. In some embodiments, a (semantic) meaning can refer to a feeling/emotion or sound effect intended to be conveyed by the word. For example, the words "tears of joy" can be associated with a joyous and/or inspirational meaning. In some embodiments, a dictionary, a database, and/or a look-up table including associations between words and (semantic) meanings can be utilized in the analyzing of a word to determine a (semantic) meaning associated with the word.

In some embodiments, the computing device can determine when to play an audio clip or element corresponding to the one or more words. In some embodiments, the computing device can attempt to determine/estimate a location where the user is reading and compare the reading location to where the one or more words are located; if the location of where the user is reading is at or near the location of the one or more words, then the corresponding audio associated with the one or more words can be played. For example, if it is determined/estimated that the user is reading the $100^{th}$ word on the current page and that the $150^{th}$ word has an audio clip associated with it (e.g., corresponding to it), then the audio clip will be played when it is determined/estimated that the user has reached the $150^{th}$ word. In some embodiments, the device can attempt to calculate a time when the user will perceive (e.g., see, read) the one or more words and play the corresponding audio when the time comes.

FIG. 1 illustrates an example environment in which aspects of the various embodiments can be utilized. The example environment 100 can comprise a computing device 102 and an electronic document 104 being displayed on the computing device 102. The electronic document 104 can be presented on a display screen of the computing device 102. The electronic document 104 can be any electronic and/or digital file, such as an electronic book, a word processing file, a spreadsheet file, a slideshow file, an electronic message, etc. A user 108 of the computing device 102 can be engaged in reading the electronic document 104.

Sometimes, the user 108 may like to listen to music when he/she is reading the electronic document 104. In some cases, if the user 108 is reading the electronic document 104 (e.g., children's book) to a younger audience, the user 108 may try to make sound effects to keep the younger audience engaged. As such, it can be beneficial to provide one or more auditory supplements/enhancements (e.g., background music, sound effects, etc.) in attempt to improve the overall user experience with respect to reading the electronic document 104.

The computing device 102 can select one or more words for which to play one or more corresponding audio files/clips (e.g., songs, poems, soundtracks, background music, ambient sounds, sound effects, etc.). In some embodiments, before the user 108 reads the electronic document 104, the computing device 102 can examine the document 104 to select one or more words for which to play audio. In some embodiments, while the user 108 is reading the electronic document 104, the computing device 102 can determine what corresponding audio to play. In some embodiments, the computing device 102 can utilize aspects of both determining audio clips (i.e., audio files, audio elements) to play before the document 104 is read and determining audio to play while the document 104 is being read. For example, the computing device 102 can determine, before the user 108 begins reading, that certain sections of the document 104 correspond to certain types of audio (e.g., peaceful music, exciting music, sad music, etc.), and the computing device can determine, while the user 108 is reading, the specific audio clips to play while the user 108 is reading through the electronic document 104.

In some embodiments, the electronic document 104 can include instructions for playing certain audio clips that correspond to certain portions of the document 104. For example, the electronic document 104 can be preset/programmed to play one or more audio clips and/or audio types at the beginning of a chapter, subsection, page, paragraph, sentence, phrase, and/or word. The audio clips to be played can be stored in an audio clip database, which can reside with the electronic document 104, with the computing device 102, and/or with a server external to the computing device 102.

Regarding corresponding audio clips, they can be played at a time calculated utilizing at least in part the location of a word with respect to the document. In some embodiments, a word for which corresponding audio is to be played is located at the beginning of a page, an example of the word being a chapter title. Accordingly, the audio can, for example, be played as soon as the user 108 turns to the page where the chapter title is located.

In some embodiments, the audio can be played at a time calculated by utilizing the location of the word in the document in a comparison between the location of the word in the document and a location (e.g., an estimated location) of where the user is reading. For example, the word can be located at or near the end of the page. The computing device 102 can also calculate that, for the current electronic document 104, the user 108 has turned the page every five minutes on average. The computing device 102 can estimate/guess/conclude that the location of where the user 108 is reading will be at or near the location of the word when it has been, for example, four minutes and 45 seconds from when the user 108 first turned onto the current page. Accordingly, at that time, the device 102 can elect to play the audio corresponding to the word.

In another example, the computing device 102 can calculate that a particular word (for which corresponding audio is to be played) is located on the current page of the electronic document 104 as the n-th word of the current page. The computing device 102 can also have access to information regarding an average reader's reading pace (i.e., how many words an average reader reads per minute). Additionally or alternatively, the computing device 102 can have access to information about the particular reading pace of the user 108 (e.g., based on accumulated and/or historical data, such as when the user 108 turns pages, how many words on each page, etc.). (The user 108 can also have a plurality of reading paces, each particular reading pace corresponding to each of a plurality of electronic documents.) As such, if, for example, the computing device 102 knows that the user 108 reads at 33 words per minute and that a particular word for which audio is to be played is the $66^{th}$ word on the current page, then the device 102 can estimate that the audio should be played two minutes from when the user 108 turned to the current page.

In some embodiments, the at least one camera 106 on the computing device 102 can be utilized in determining the location of where the user 108 is reading. For example, the camera 106 can be a front-facing (i.e., user facing) camera and can capture an image (e.g., picture, video, etc.) of one or more eyes of the user 106. The captured image can be used to determine (e.g., track) a gaze direction of the user 108. The gaze direction can be used to determine the (estimated) location of where the user 108 is reading. For example, if the user's gaze is determined to be looking toward the upper left corner of the electronic document, it is likely that the user is at the beginning of the current page. Continuing with the example, if an audio clip is to be played for a word(s) located at the bottom right corner of the page (e.g., at the end portion of the page), then the audio clip can be played when the gaze of the user 108 reaches that bottom right corner location. As such, the audio corresponding to the word(s) can be played at the appropriate time (e.g., when the location of where the user is reading as determined by his/her gaze is at or close in proximity to the word(s) for which the corresponding audio is to be played).

Figure 2:
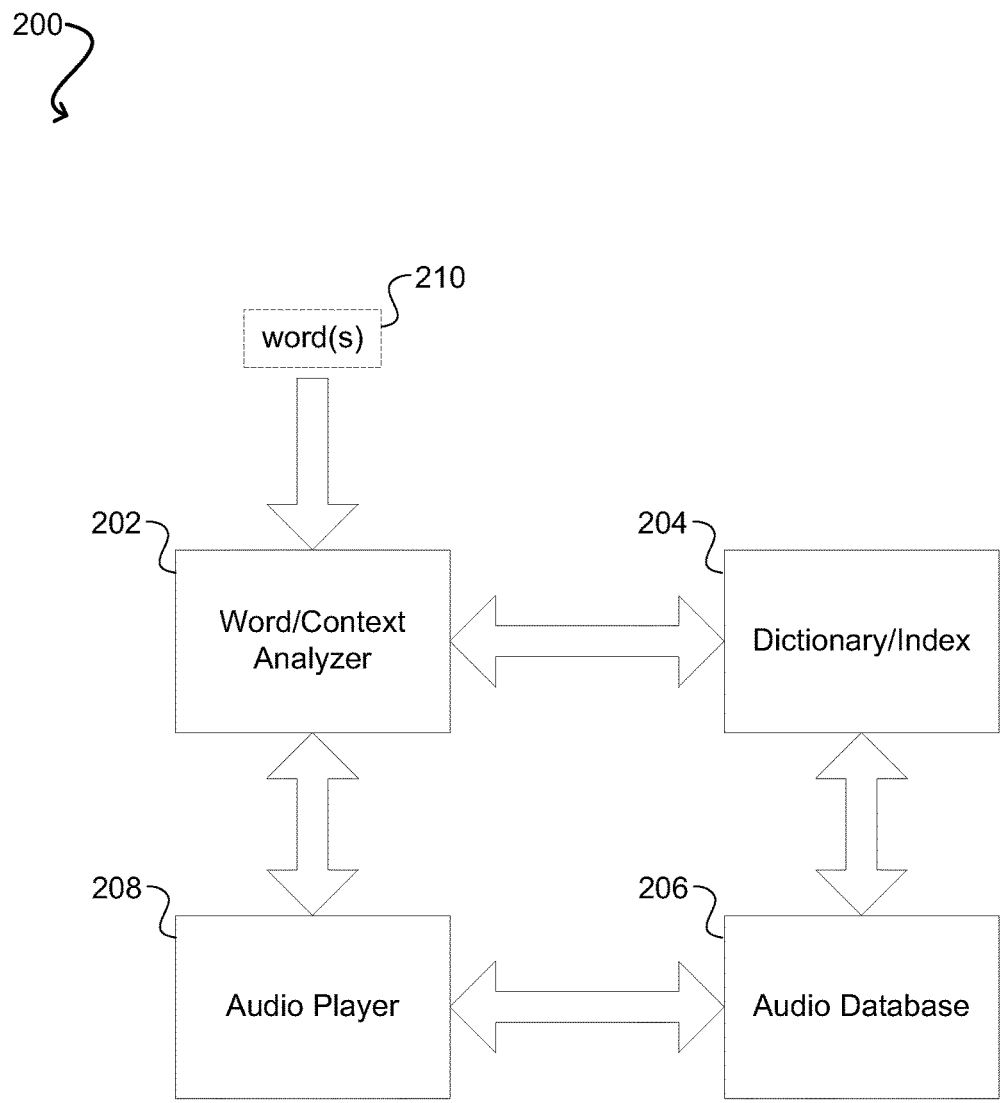
FIG. 2 illustrates an example device embodiment for auditory enhancement based on word analysis.

FIG. 2 illustrates an example system embodiment for auditory enhancement based on word analysis. The example system embodiment 200 can comprise a word and/or context analyzer 202, a dictionary and/or index 204, an audio database 206, and an audio player 208. The various components of the system embodiment can be controlled and/or aided by at least one processor (not illustrated in FIG. 2). The processor can facilitate and/or control the various operations of the components as well as facilitate communication among the components.

In some embodiments, one or more words 210 from an electronic document can be analyzed by the word/context analyzer 202 to determine one or more semantic meanings and/or contexts associated with the one or more words 210. For example, the words "it made her furious" can be analyzed by the word/context analyzer 202 to determine that a character in the document is mad and angry and that these words correlate to an intense and powerful context.

The word/context analyzer 202 can communicate with the dictionary/index 204 to search for audio clips associated with (e.g., corresponding to) words such as "furious," "anger," "mad," "intense," "strong," and/or "powerful." The dictionary/index 204 can store associations (e.g., correspondences) between audio and words. The dictionary/index 204 can find one or more corresponding audio clips based upon the words provided. The dictionary/index 204 can communicate to the audio database 206 to request and/or gain access to the corresponding audio clip(s).

The audio database 206 can reside on any storage unit, such as a memory device, capable of storing audio. The audio can be a digital/electronic audio clip in any audio file format including, but not limited to, mp3, SMF, wav, wma, etc. The audio database 206 can communicate with the dictionary/index 204 to provide audio clips that are associated with the words provided to the dictionary/index 204. The audio clips can be provided to the audio player 208 to be played.

The audio player 208 can be a portion of a computing system/device that handles audio (input and) output, such as a sound card or an integrated portion of the motherboard for handling audio output. The audio player 208 can communicate with the word/context analyzer 202 and/or the audio database 206 to play the audio clip(s) associated with the word(s). The audio player 208 can output the audio clip(s) via speakers and/or earphones (e.g., ear buds, headphones, etc.), which can then be acoustically heard by a user.

In some embodiments, the word/context analyzer 202, the dictionary/index 204, the audio database 206, and the audio player 208 can all reside on a first computing device. In some embodiments, the dictionary/index 204 can reside with the audio database 206. In some embodiments, the dictionary/index 204 and/or the audio database 206 can reside on a device/server external to the first computing device. In some embodiments, the word/context analyzer 202 can be optional, in that one or more words from the electronic document are provided to the dictionary/index 204 to find any audio clips that are associated with the provided word(s).

Figure 3A:
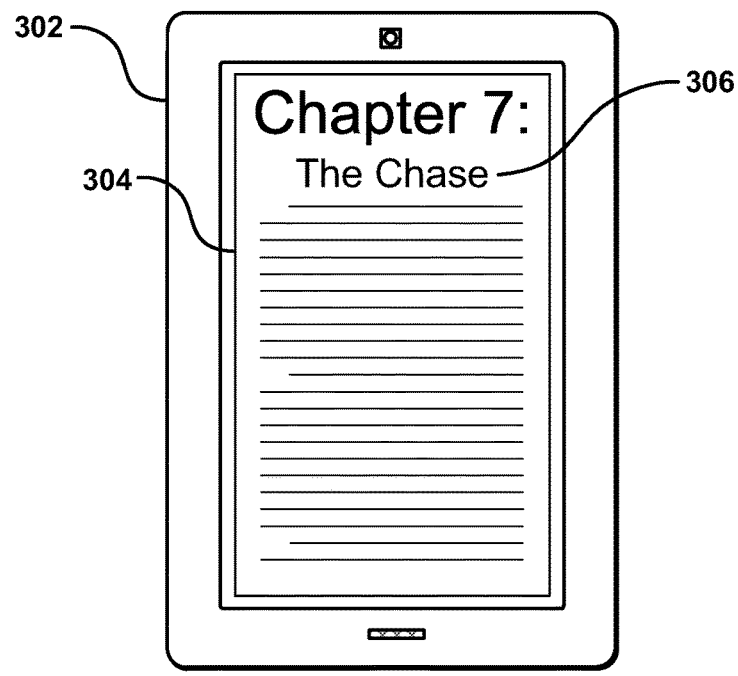
FIG. 3A illustrates an example device embodiment for auditory enhancement based on word analysis.

FIG. 3A illustrates an example device embodiment for auditory enhancement based on word analysis. An electronic document 304, such as an electronic book, can be displayed in an application running on a computing device 302. FIG. 3A illustrates the computing device 302 examining a chapter title 306 (e.g., one or more words in the chapter title 306) of the electronic document 304.

In some embodiments, the chapter title (e.g., "Chapter 7: The Chase") 306 can be analyzed to determine a semantic meaning associated with the word(s) in the title (e.g., "chase"). For example, the computing device 302 can determine a semantic meaning for the word "chase." The computing device 302 can determine that a chapter involving a "chase" can be an intense, exciting, and/or climatic portion of the electronic document. Accordingly, the computing device 302 can search a database for an appropriate audio clip, such as background music that is intense and/or exciting. When a user of the computing device 302 is reading "Chapter 7: The Chase," the computing device 302 can play the intense and/or exciting background music to further enhance the overall user experience of reading the electronic document.

Figure 3B:
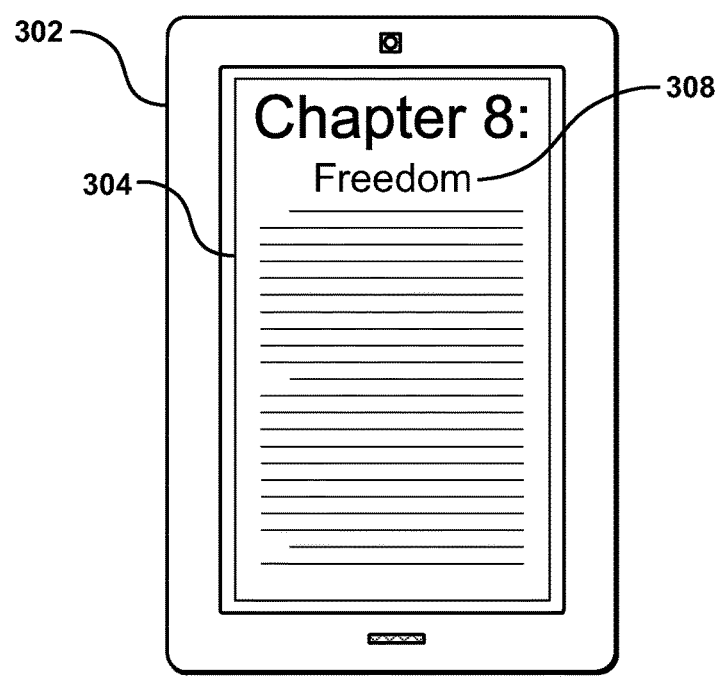
FIG. 3B illustrates an example device embodiment for auditory enhancement based on word analysis.

FIG. 3B illustrates an example device embodiment for auditory enhancement based on word analysis. FIG. 3B shows a chapter ("Chapter 8: Freedom") 308 subsequent to the chapter ("Chapter 7: The Chase") 306 in FIG. 3A. As discussed previously, the computing device 302 can analyze the chapter title (e.g., "Chapter 8: Freedom") 308 to determine a semantic meaning associated with the word(s) in the title (e.g., "freedom"). For example, the computing device 302 can determine a semantic meaning of the word "freedom" such that the device 302 can infer that a chapter involving "freedom" should have joyous and/or happy background music associated with it. As such, the computing device 302 can elect to play happy and/or joyful background music when the user reads "Chapter 8: Freedom."

In some embodiments, the computing device 302 can analyze multiple chapter titles to better understand the context of each chapter and/or the overall context of the electronic document 304. For example, if the computing device 302 considers "Chapter 7: The Chase" in conjunction with "Chapter 8: Freedom," the device 302 can better understand or make a likelier conjecture/deduction that the freedom of chapter 8 is achieved from escaping the chase of chapter 7; this can further confirm that intense/exciting background music should be played for chapter 7 and joyful/happy music for chapter 8.

In some embodiments, there can be harmonious transitions from one audio (e.g., background music) to the next. For example, the selections of the background music for "Chapter 7: The Chase" and "Chapter 8: Freedom" can take into consideration (the rhythm, tempo, beat, tone, key, melody, harmony, etc. of) the transitional ending of the background music for "Chapter 7: The Chase" as well as (the rhythm, tempo, beat, tone, key, melody, harmony, etc. of) the transitional beginning of the background music for "Chapter 8: Freedom." In other words, the background music for "Chapter 7: The Chase" can be selected to have an ending that transitions nicely into the beginning of the background music for "Chapter 8: Freedom," and vice versa. In some embodiments, some or all of the audio (e.g., background music) elected for the electronic document 304 can have harmonious transitions. For example, all of the background music can be of the same genre (e.g., classical). In some embodiments, fade-ins and/or fade-outs can be utilized for background music transitions. For example, the background music for "Chapter 7: The Chase" can be faded out as the background music for "Chapter 8: Freedom" fades in. In some embodiments, the transitions can be pre-cached, such as for faster loading. For example, there can be a buffer (e.g., a five second buffer) such that the quality of the audio playback will not be significantly affected (negatively) by rapid page turns.

Figures 4A, 4B:
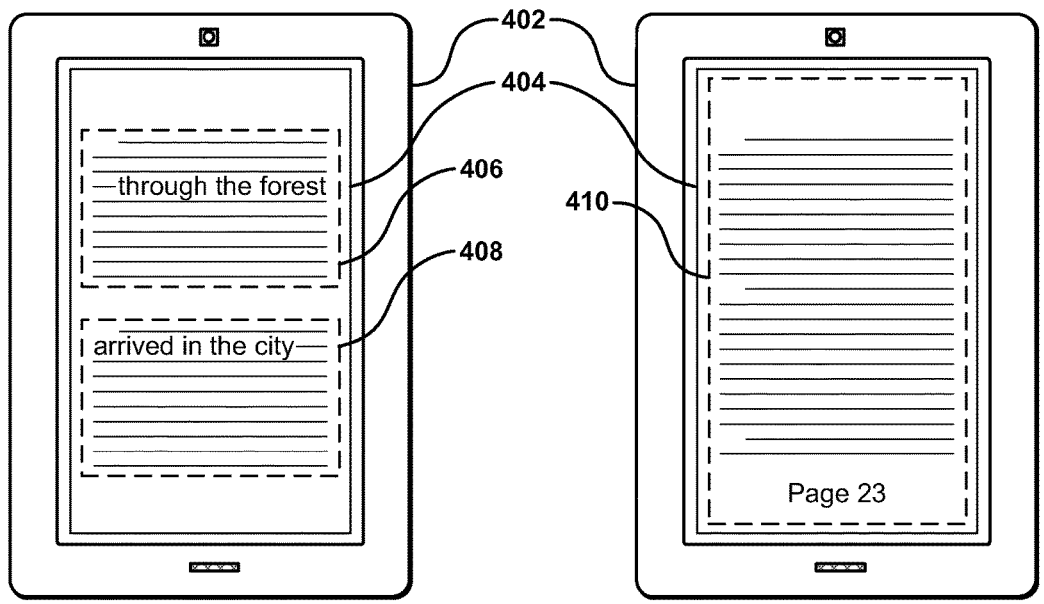
FIG. 4A illustrates an example system embodiment for auditory enhancement based on word analysis.
FIG. 4B illustrates an example system embodiment for auditory enhancement based on word analysis.

FIG. 4A illustrates an example device embodiment for auditory enhancement based on word analysis. In FIG. 4A, a computing device 402 can display an electronic document 404, such as an electronic book. The computing device 402 can analyze a paragraph (i.e., one or more words in a paragraph) to determine a semantic meaning(s) associated with (the one or more words in) the paragraph. In some embodiments, the computing device 402 can select a corresponding audio clip(s), based at least in part upon (the words in) the paragraph and/or the determined semantic meaning(s), to play when a user is reading the paragraph.

For example, the first paragraph 406 on the current page in FIG. 4A can be analyzed to determine that the setting of the paragraph 406 occurs in a "forest"; this can be due to the fact that the paragraph 406 contains the words "through the forest," which along with the rest of the context (assuming the rest is consistent with the words) suggest that there is a good likelihood that the scene of paragraph 406 is in a forest. As such, for the first paragraph 406, the computing device 402 can play audio clips that are associated with a "forest," such as sounds of birds chirping, frogs croaking, etc.

Continuing with the example, the computing device 402 can analyze the second paragraph 408 to determine that the scene has changed to a "city," which can be due to the fact that the words "arrived in the city" appear in the second paragraph 408. If the rest of the paragraph 408 is consistent with this notion, then the computing device 402 can play audio clips associated with a "city" (e.g., traffic sounds, bus noises, people chattering, etc.) for the second paragraph 408.

FIG. 4B illustrates an example device embodiment for auditory enhancement based on word analysis. In FIG. 4B, the computing device 402 can analyze a page (i.e., one or more words in a page) to determine a semantic meaning(s) associated with (the one or more words in) the page. The computing device 402 can play a corresponding audio clip(s) based upon (the words in) the page and/or the associated semantic meaning(s).

Figure 4C:
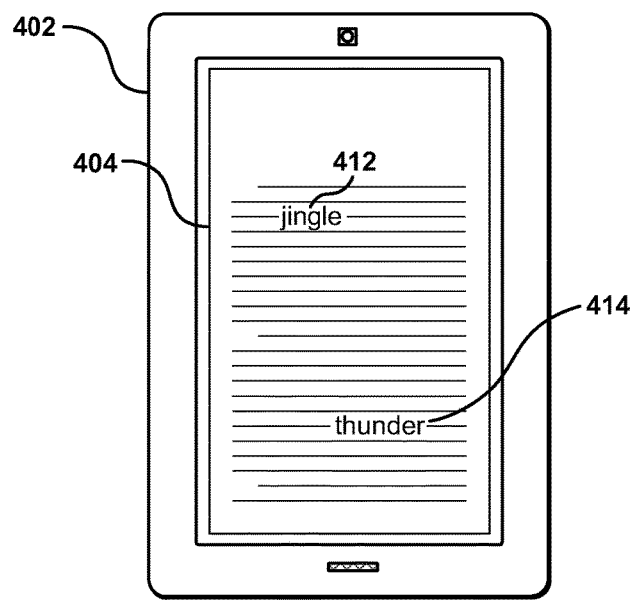
FIG. 4C illustrates an example system embodiment for auditory enhancement based on word analysis.

FIG. 4C illustrates an example device embodiment for auditory enhancement based on word analysis. The computing device 402 of FIG. 4C can display an electronic document 404 that has one or more "key" words, such as "jingle" 412 and "thunder" 414. In some embodiments, a key word can trigger an audio clip in the form of a sound effect. For example, a key word such as "jingle" can trigger a jingle sound effect whereas a key word such as "thunder" can trigger a thunder sound effect. In some embodiments, key words do not require semantic analyses; in other words, in some embodiments, the audio database can be searched directly for an audio file using a key word (e.g., "jingle," "thunder," "boom," "thud," etc.).

Figure 5:
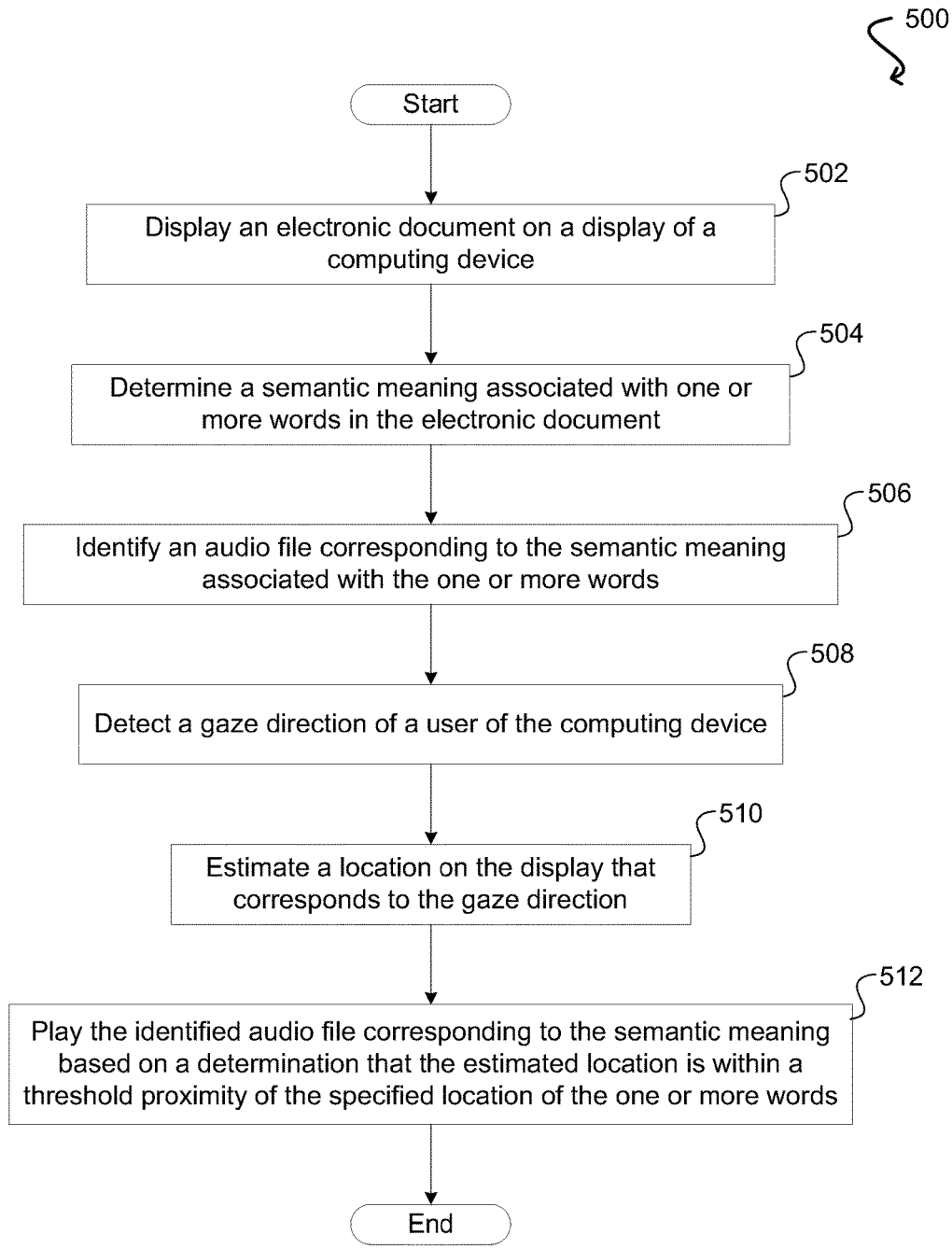
FIG. 5 illustrates an example method embodiment for auditory enhancement based on word analysis.

FIG. 5 illustrates an example method embodiment 500 for auditory enhancement based on word analysis. It should be understood that there can be additional, fewer, or alternative steps performed in similar or alternative orders, or in parallel, within the scope of the various embodiments unless otherwise stated. The example method embodiment 500 can start with displaying an electronic document on a display of a computing device, at step 502. At step 504, the example method 500 can determine a semantic meaning associated with one or more words in the electronic document. The one or more words can be located at a specified location within the electronic document displayed on the computing device. For example, the one or more words can be located on page 12, second paragraph, fourth sentence, at words six through eleven.

At step 506, the example method 500 can identify an audio file corresponding to the semantic meaning associated with the one or more words. In some embodiments, the audio file can be stored in a database. The database can store at least one audio file corresponding to at least one semantic meaning. For example, the database can store happy songs to be associated with words such as "happy," "joyous," "cheerful," etc.

The example method 500 can detect a gaze direction of a user of the computing device, at step 508. The gaze direction can be relative to the display of the computing device. The method 500 can estimate a location on the display that corresponds to the gaze direction, at step 510.

At step 512, the method embodiment 500 can play the identified audio file corresponding to the semantic meaning based on a determination that the estimated location is within a threshold proximity of the specified location of the one or more words. In other words, when the method 500 determines that where the user is gazing (e.g., presumably reading) is close in proximity to the one or more words, the method 500 can play the audio corresponding to the one or more words.

Figure 6:
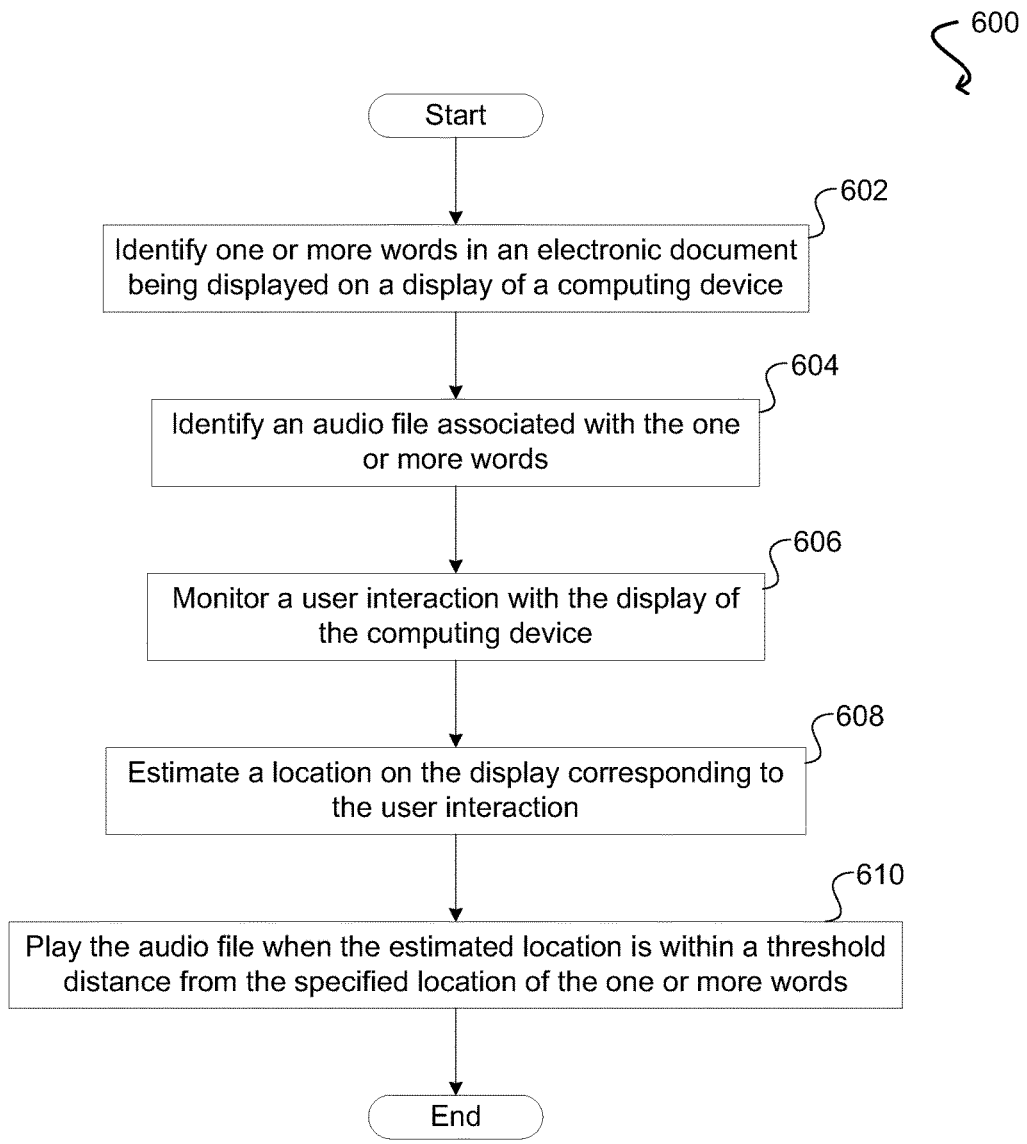
FIG. 6 illustrates an example method embodiment for auditory enhancement based on word analysis.

FIG. 6 illustrates an example method embodiment 600 for auditory enhancement based on word analysis. Again, it should be understood that there can be additional, fewer, or alternative steps performed in similar or alternative orders, or in parallel, within the scope of the various embodiments unless otherwise stated. The example method embodiment 600 can identify one or more words in an electronic document being displayed on a display of a computing device, at step 602. The one or more words can be located at a specified location in the electronic document.

At step 604, the method embodiment 600 can identify an audio file associated with the one or more words. At step 606, the example method 600 can monitor a user interaction with the display of the computing device. The user interaction can be performed by a user of the computing device. For example, the method can monitor a user interaction such as a gaze direction of the user. In another example, the method can monitor a user interaction such as a reading pace of the user (e.g., determined based on historic data, previous page turns, etc.).

At step 608, the method 600 can estimate a location on the display corresponding to the user interaction. Then the method 600 can play the audio file based on a determination that the estimated location is within a threshold distance from the specified location of the one or more word, at step 610.

In some embodiments, the electronic document can be an electronic audio book. The calculating of the time at which the one or more words will be perceived by the user can be based at least in part upon when the computing device will output (e.g., play, read aloud, etc.) the one or more words in the electronic audio book to be perceived by the user.

In some embodiments, the audio clip can be available for purchase as an enhancement and/or supplement to the electronic document. For example, when purchasing the electronic document, there can be an option to buy auditory enhancements (e.g., audio clips/files) for the electronic document. In another example, upon opening the electronic document, there can be an option to purchase auditory enhancements.

In some embodiments, the selecting of the one or more words in the electronic document can comprise selecting one or more adjectives in the electronic document. The one or more adjectives can depict a mood (e.g., tone) of the electronic document at the specified location. For example, adjectives in an electronic document such as "dark," "crimson," "savage," and "ominous" can depict a sad, solemn mood/tone of the document. Audio clips/files associated with these adjectives can be dark and serious.

In some embodiments, the user can choose a particular style/type of audio content (e.g., genre of music) for the audio file/clip. The style/type of audio can include, but is not limited to, classical music, rock music, ska music, modern music, electronic music, pop music, hip hop music, rhythm and blues, blues, jazz, country music, or folk music. For example, there can be peaceful/relaxing classical music as well as intense/exciting classical music. In another example, there can be sad/somber rock music as well as joyous/happy rock music. As such, a user can choose (and switch between) which type of audio (e.g., genre of music) he/she desires to listen to when reading the electronic document.

In some embodiments, one or more adjectives in the electronic document can modify the volume, intensity, and/or the selection of the audio for the electronic document. For example, the adjective "crazy" in front of the word "crash" might result in the selection of a loud and intense audio, whereas the adjective "tragic" in front of "crash" might result in the selection of a darker, more somber audio.

In some embodiments, a map of an entire sentence, paragraph, page, chapter, and/or the entire document can be created. The map can be utilized to determine where transitions exist, where lighter moods are, where darker moods are, etc. In some embodiments, the electronic document can be preset/(pre-)programmed to contain a broad range of audios, e.g., from general audio types (e.g., joyful songs, sad songs, etc.) to specific audios (e.g., "Joy to the World," "Ode to Joy," etc.). In some embodiments, the audio can be pre-cached, such as for faster loading.

In some embodiments, the audio for the electronic document can be saved by the user and/or shared with other users. In some embodiments, the publisher, author, etc., can suggest/offer audio to be played with the electronic document. In some embodiments, sample audio content can be provided with the electronic document and/or an option to buy the full version of the audio content (e.g., sound effects, theme music, background music, etc.) for the electronic document.

Various embodiments consistent with the present disclosure can also be implemented with a rating system. In some embodiments, the selecting of the one or more words in the electronic document can be based at least in part upon feedback (e.g., a suggestion) by at least one third party, such as another user. For example, the at least one third party can suggest that the words "waves on the beach" should be selected such that a corresponding audio file can be played. In some embodiments, the association between the audio clip and the one or more words can be based at least in part upon feedback (e.g., a suggestion) by at least one third party. For example, the at least one third party can suggest that for the word "rain" at a particular location in the document, an audio clip of a light drizzle fits better than an audio clip of heavy rainfall. Furthermore, in some embodiments, the user can provide feedback relating to overall user experience for the playing of the audio clip for the associated one or more words. For example, the user can provide feedback as to how well an audio clip corresponded to a particular word(s), whether the timing of the playing of the audio clip was correct, and/or other various concerns.

Figure 7:
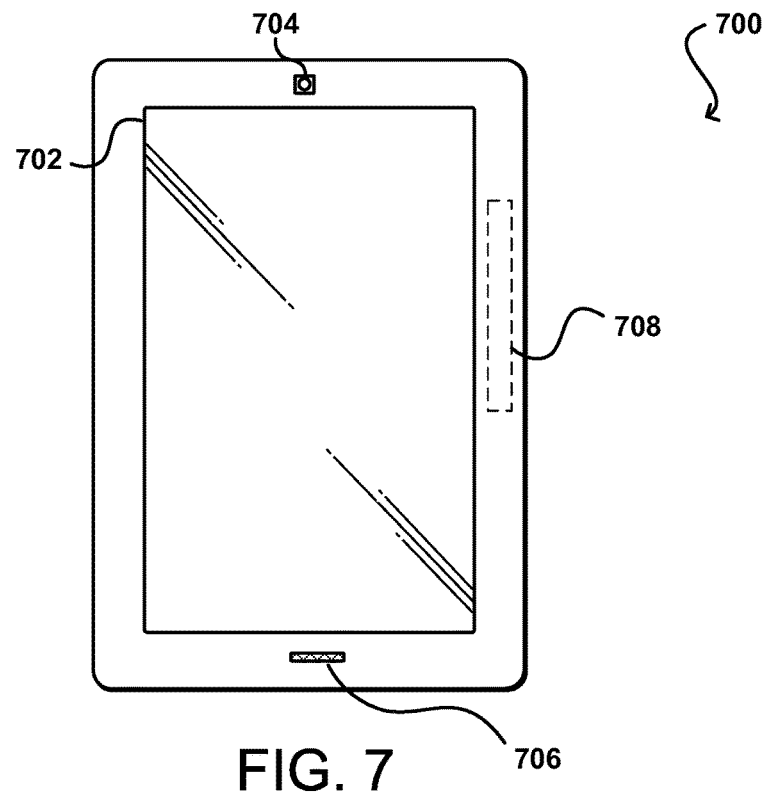
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
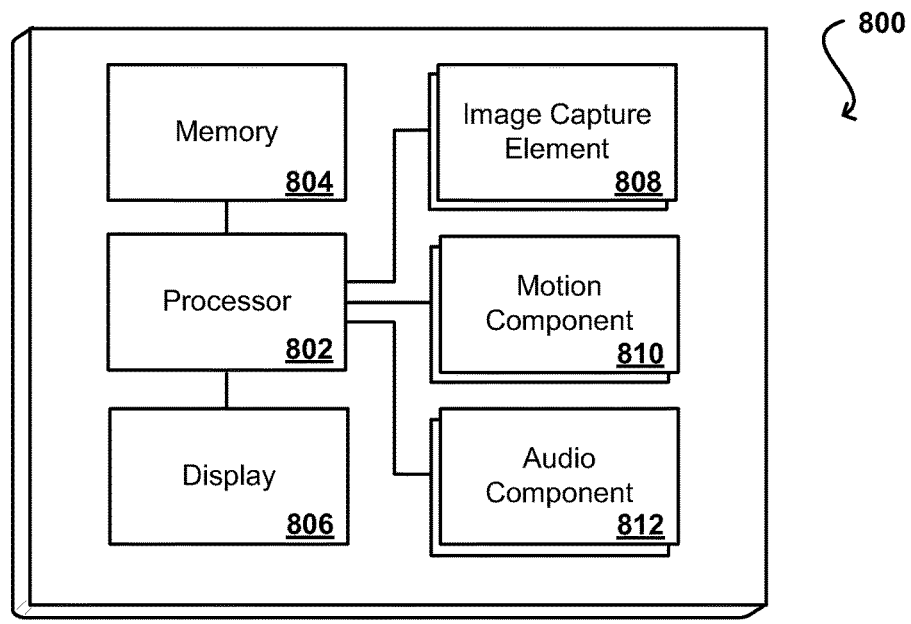
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
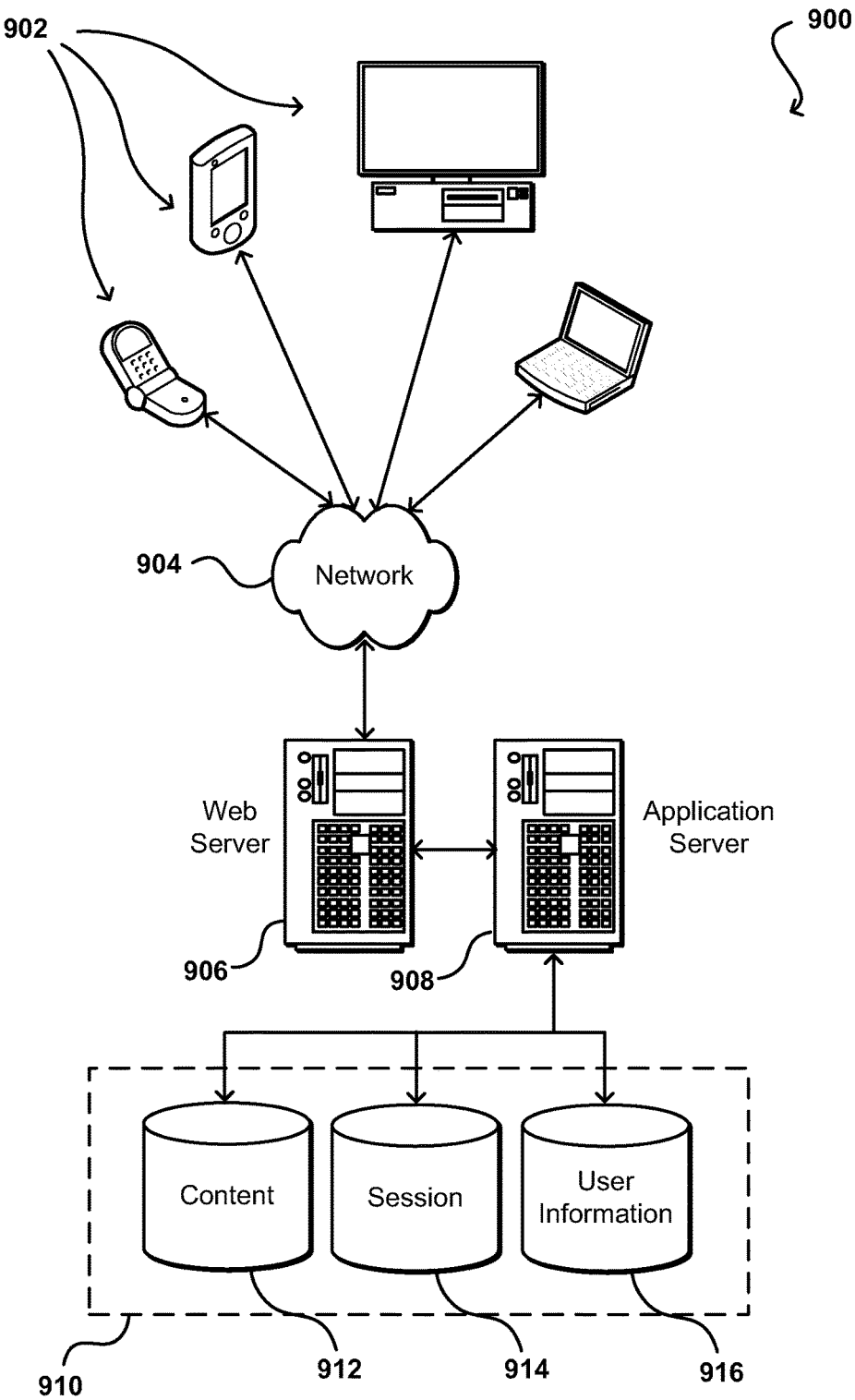
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
  displaying an electronic document on a display of a computing device;
  determining a semantic meaning associated with one or more words in the electronic document, the one or more words being located at a specific location of the electronic document being displayed on the computing device;
  identifying an audio file corresponding to the semantic meaning;
  detecting a gaze direction of a user of the computing device, the gaze direction being relative to the display of the computing device;
  determining an estimated location on the display that corresponds to the gaze direction;
  determining that the estimated location is within a threshold distance from the specific location of the one or more words; and
  playing the audio file with a volume based at least in part upon the semantic meaning of the one or more words and determining that the estimated location is within the threshold distance from the specific location of the one or more words.

2. The computer-implemented method of claim 1, wherein the audio file comprises at least one of a song, a poem, a soundtrack, background music, an ambient sound, or a sound effect, and wherein the electronic document is at least one of an electronic book, a word processing file, a slideshow file, or an electronic message.

3. The computer-implemented method of claim 1, wherein determining the semantic meaning includes determining at least one of a definition, feeling, emotion, sound, or mood associated with the one or more words.

4. A computer-implemented method, comprising:
  identifying a semantic meaning associated with one or more words in an electronic document being displayed on a display of a computing device, the one or more words being located at a specific location of the electronic document;
  identifying an audio file associated with the semantic meaning;
  determining a gaze direction of a user relative to the display;
  determining an estimated location on the display corresponding to the gaze direction;
  determining that the estimated location is within a threshold distance from the specific location of the one or more words; and
  playing the audio file with a volume based at least in part upon the semantic meaning of the one or more words and determining that the estimated location is within the threshold distance from the specific location of the one or more words.

5. The computer-implemented method of claim 4, further comprising:
  capturing an image including a representation of one or more eyes of the user using a camera on the computing device; and
  analyzing the image including the representation of the one or more eyes.

6. The computer-implemented method of claim 4, wherein monitoring the user interaction includes:
  estimating a reading pace associated with the user; and
  detecting a page turn command input by the user,
  wherein determining the estimated location is based at least in part upon the page turn command and the reading pace.

7. The computer-implemented method of claim 4, wherein the semantic meaning corresponds to a mood, and wherein the audio file is identified based on the mood.

8. The computer-implemented method of claim 4, further comprising:
  receiving feedback relating to the audio file.

9. The computer-implemented method of claim 4, wherein the audio file is at least one of a song, a poem, a soundtrack, background music, an ambient sound, or a sound effect, and wherein the electronic document is at least one of an electronic book, a word processing file, a slideshow file, or an electronic message.

10. The computer-implemented method of claim 9, wherein the electronic document is an electronic book relating to a movie and wherein the audio file is a soundtrack relating to the movie.

11. The computer-implemented method of claim 4, further comprising:
  audibly outputting content of the electronic document, including the one or more words, wherein the electronic document is an electronic audio book, and wherein playing the audio file is further based at least in part upon the one or more words being audibly outputted.

12. The computer-implemented method of claim 6, wherein estimating the reading pace of the user is based at least in part upon historical data regarding a time it took for the user to turn one or more pages in one or more previously read electronic documents.

13. The computer-implemented method of claim 6, wherein estimating the reading pace of the user is based at least in part upon a time it took for the user to turn one or more previous pages in the electronic document.

14. The computer-implemented method of claim 4, further comprising:
  receiving a type of audio content for the audio file, wherein the audio file is identified from a plurality of audio files corresponding to the type of audio content.

15. A system comprising:
  a display;
  a processor; and
  a memory device including instructions that, when executed by the processor, cause the system to:
    identify a semantic meaning associated with one or more words in an electronic document being displayed on the display, the one or more words being located at a specific location of the electronic document;
    identify an audio file associated with the semantic meaning;
    determine a gaze direction of a user relative to the display;
    determine an estimated location on the display corresponding to the gaze direction;

determine that the estimated location is within a threshold distance from the specific location of the one or more words; and play the audio file with a volume based at least in part upon the semantic meaning of the one or more words and a determination that the estimated location is within the threshold distance from the specific location of the one or more words.

16. The system of claim 15, further comprising:

at least one camera, wherein the instructions when executed further cause the system to:

capture an image including a representation one or more eyes of the user using the at least one camera; and analyze the image including the representation of the one or more eyes.

17. The system of claim 15, wherein the instructions when executed further cause the system to:

estimate a reading pace associated with the user; and detect a page turn command input by the user, wherein the estimated location is determined based at least in part upon the page turn command and the reading pace.

18. The system of claim 17, wherein the reading pace associated with the user is estimated based at least in part upon historical data regarding a time it took for the user to turn one or more pages in one or more previously read electronic documents.

19. The system of claim 17, wherein the reading pace associated with the user is estimated based at least in part upon a time it took for the user to turn one or more previous pages in the electronic document.

20. The system of claim 15, wherein the audio file is at least one of a song, a poem, a soundtrack, background music, an ambient sound, or a sound effect, and wherein the electronic document is at least one of an electronic book, a word processing file, a slideshow file, or an electronic message.

21. A non-transitory computer-readable storage medium including instructions for identifying elements, the instructions when executed by a processor of a computing device causing the computing device to:

identify a semantic meaning associated with one or more words in an electronic document being displayed on a display of the computing device, the one or more words being located at a specific location of the electronic document;

identify an audio file associated with the semantic meaning;

determine a gaze direction of a user relative to the display;

determine an estimated location on the display corresponding to the gaze direction;

determine that the estimated location is within a threshold distance from the specific location of the one or more words; and play the audio file with a volume based at least in part upon the semantic meaning of the one or more words and a determination that the estimated location is within the threshold distance from the specific location of the one or more words.

22. The non-transitory computer-readable storage medium of claim 21, wherein the instructions when executed cause the computing device to further:

receive a type of audio content for the audio file, wherein the audio file is identified from a plurality of audio files corresponding to the type of audio content.

23. The non-transitory computer-readable storage medium of claim 21, wherein the instructions when executed cause the computing device to further:

receive feedback relating to the audio file.

* * * * *